F. F. QUEDNOW AND G. J. VOKEL.
ELECTRIC SOLDERING IRON.
APPLICATION FILED OCT. 27, 1921.
1,431,039.
Patented Oct. 3, 1922.
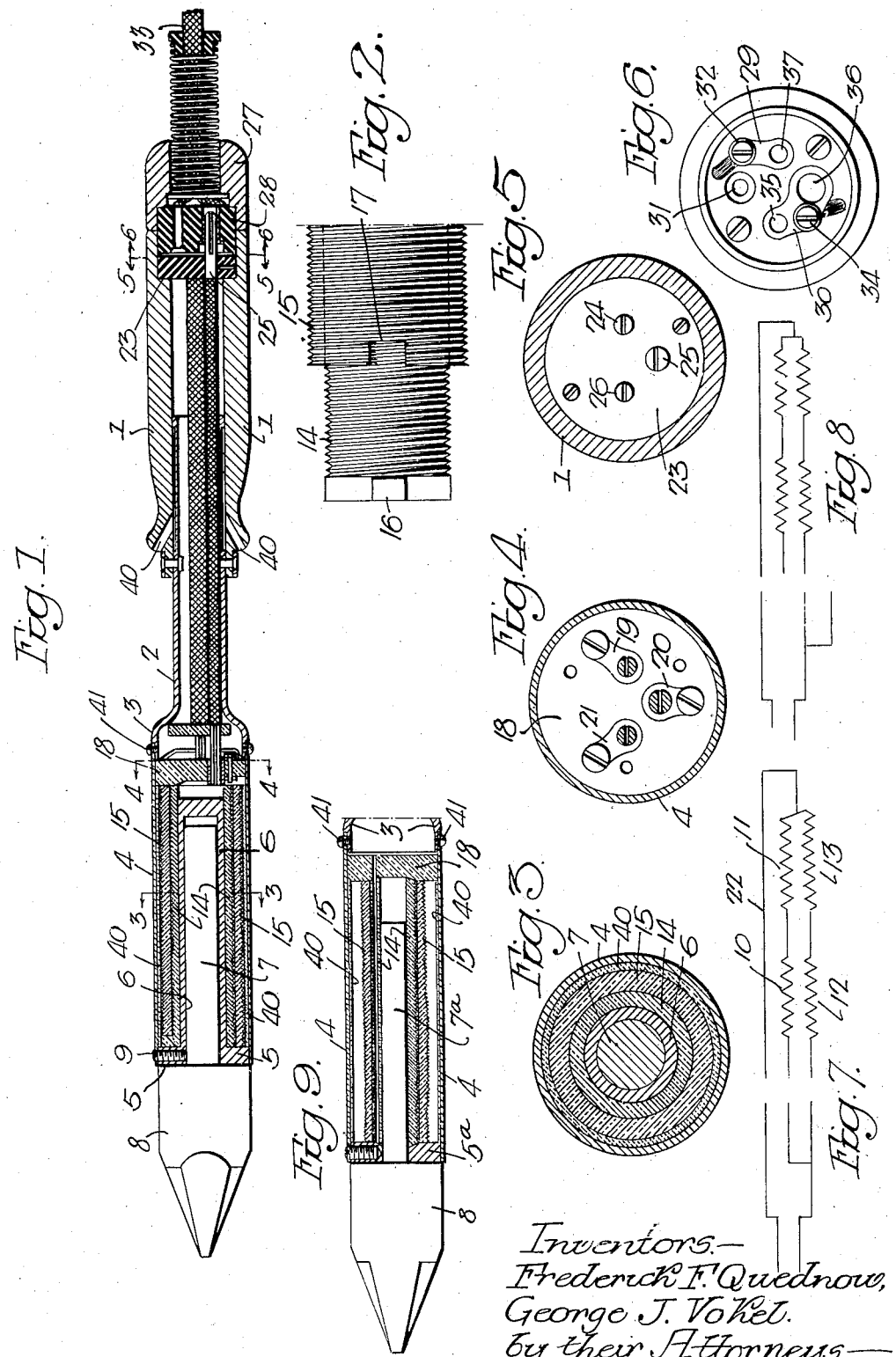

Patented Oct. 3, 1922.

1,431,039

UNITED STATES PATENT OFFICE.

FREDERICK F. QUEDNOW AND GEORGE J. VOKEL, OF PHILADELPHIA, PENNSYLVANIA.

ELECTRIC SOLDERING IRON.

Application filed October 27, 1921. Serial No. 510,739.

*To all whom it may concern:*

Be it known that we, FREDERICK F. QUEDNOW and GEORGE J. VOKEL, citizens of the United States, residing in Philadelphia, Pennsylvania, have invented Electric Soldering Irons, of which the following is a specification.

One object of our invention is to provide a durable, convenient and highly efficient form of electrically heated soldering iron of such construction that its heating units may be quickly and conveniently replaced and which shall include means whereby the degree of heat of the iron may be conveniently varied at will.

We further desire to provide a soldering iron with novel means for supporting its heating element, which means shall be of a construction adapted for the convenient subdivision and efficient operation of said element.

These objects and other advantageous ends we attain as hereinafter set forth, reference being had to the accompanying drawings, in which, Fig. 1 is a longitudinal vertical section of a soldering iron constructed in accordance with our invention;

Fig. 2 is an elevation of parts of the lava tubes for supporting the heating elements, showing one of said tubes partly inserted in the other;

Figs. 3 and 4 are vertical sections respectively on the lines 3—3 and 4—4, Fig. 1;

Figs. 5 and 6 are vertical sections viewed from opposite directions and taken on the line 5—5, Fig. 1;

Figs. 7 and 8 are diagrammatic views illustrating the means for obtaining different degrees of heat; and Fig. 9 is a fragmentary vertical section of a slightly modified form of our soldering iron.

In the above drawings, 1 represents a handle of wood or other electrical insulating material which is a poor conductor of heat, and this is made tubular for the reception in one end of the tubular body 2—3. The part 3 of this body is of larger diameter than the part 2 and has detachably connected to it by means of a series of screws a cylindrical metal shell 4 into whose open forward end fits the flange 5 of a metallic sleeve 6 extending substantially concentric with it and inside of the same. Within the sleeve 6 is closely fitted a cylindrical stem 7 integral with the soldering point 8, which as shown has a flat shoulder or end portion held in close contact with the flange 5 and is immovably held within the sleeve 6 by a set screw 9. By loosening this screw the soldering point may be removed to permit of the insertion of other points of different sizes and forms. Within the space between the shell 4 and the sleeve 6 are mounted two telescoping tubes of suitable highly refractory electrical insulating material made in the present instance of lava and having molded or otherwise formed in their external surfaces helical grooves for the reception of the wire heating coils 10—11 and 12—13 of our soldering iron.

In the present instance we preferably employ, and have illustrated each of the tubes 14 and 15 as provided with double thread so that each tube may receive one part of each heating coil and we prevent relative rotation of said tubes by forming a projecting tongue 16 on one of them and providing the other with a correspondingly formed recess 17 for the reception of said projection.

In the rear end of the shell 4 immediately adjacent the ends of the tubes 14 and 15 we mount a terminal plate 18 of insulating material carrying three terminals 19, 20 and 21 of which the last is connected to one terminal of the coil 12 whose second terminal is connected to one end of the coil 13. The terminal 20 is connected to one terminal of the coil 10 whose second terminal is connected to one terminal of the coil 11. The second terminals of the two coils 11 and 13 are connected together and through a wire 22 are connected to the terminal 19. Forming part of or associated with each of these three terminals are plates each having therein a hole extending parallel with the central line of the soldering iron and it is noted that the two coils or windings 10 and 11 are placed in the double helical groove of one of the lava tubes 14, while the other two coils or windings 11 and 13 are similarly wound in the double grooves of the other tube 15.

In the rear end of the handle 1 is mounted an insulating plate or block 23 held in place in any suitable manner as by screws and having projecting from its rear or exposed face longitudinally slotted terminal contact plugs 24, 25 and 26. These, in accordance with our invention, are provided by the ends of three insulated conductors extending longitudinally through the handle and through the body 2—3, from whose front end they project sufficiently to be insertable within the openings in the terminal plates 19, 20 and 21 on the insulating block 18. These front ends of said conductors are likewise slotted so that they, like the opposite ends, constitute plugs which are more or less resilient and tightly fit into the terminal plates; it being noted that while the conductors 24 and 26 are preferably of the same diameter that of the conductor 25 is of a diameter materially larger than the others.

The rear end of the handle is closed by a head piece 27 having mounted within it a flanged insulating block 28 projecting so as to be capable of fitting into the rear open end of the handle 1. This block is suitably fastened in the head piece and carries a pair of terminal plates 29 and 30, in addition to which it has a hole 31 capable of receiving the large diameter end of the plug 25. The plate 29 has a terminal screw 32 for the connection of a supply conductor leading from a cable 33 extending into and fixed in the head 27 and a second conductor from said cable is connected by a screw 34 to the terminal plate 30. This latter has in it two suitably spaced holes 35 and 36 of which one is designed to receive the large diameter plug 25 and the other to receive either of the small diameter plugs 24. The terminal plate 29 likewise is provided with a hole parallel with the holes 35 and 36 of such a diameter as to be closely fitted by either of the small diameter plugs.

With the above described arrangment of parts, if the head 27 be applied to the handle so that the large diameter plug 25 enters the opening 36 and the two plugs 24 and 26 enter the openings 35 and 37, current is then free to flow through the coils 10—13 as indicated in Fig. 7, under which conditions the two pairs of coils 10—11 and 12—13 are connected in parallel and heat the sleeve 6, stem 7 and point 8 to a maximum temperature. If, however, the head 27 be applied to the handle 1 so that the large diameter plug 25 extends into the hole 31 while the plugs 26 and 24 extend into the holes 37 and 35, then but a single pair of the coils, as 10—13, is in circuit, so that while the point 8 is heated, its temperature is not so high as before. The handle 1 is provided with a pair of passages 40 permitting circulation of air around the part of the body 2 which projects into it, as well as from within said body, so that danger of excessive heating of the handle is prevented.

If desired, we may altogether omit the metallic sleeve 6 and as shown in Fig. 9, insert the stem $7^a$ directly within the inner tube 14, as before however, providing a metallic flange in the form of a ring $5^a$ for the reception of a set screw 9 whereby the shell 4 is rigidly connected to the stem $7^a$. Obviously in case of damage to the coils or the lava tubes 14 and 15, we may remove the latter with the utmost ease merely by taking out the screws 41 which hold the part 3 of the body to the shell 4 and withdrawing the handle and body with the plugs 24, 25 and 26 from engagement with the terminal plates 19, 20 and 21. Thereafter the insulating block 18 with the tubes and heating elements may be withdrawn from the shell 4 and separated by disconnecting the necessary wires.

From the above description it will be appreciated we are enabled to vary the temperature to which the point 8 is raised or maintained by a quick and convenient adjustment, the various parts of the device being simple in construction and arranged in a substantial manner so that they are not likely to get out of order. Owing to the different diameters of the ends of the conductors constituting the plugs 24, 25 and 26, the various parts are necessarily connected in either of two desired ways without possibility of their being so inserted as to short circuit the supply conductors.

If desired a sleeve or wrapping 40 of material such as asbestos or other poor conductor of heat may be placed upon or around the outer lava tube with its winding and the shell 4 to prevent excessive heating of the latter. While the head or end structure is shown as constituting part of the handle, it may be utilized as a support and receptacle for the soldering iron as a whole, in which case the plugs 24—26 not only serve to conduct current to the heating coils, but also act as mechanical supporting or connecting members.

We claim:

1. The combination in a soldering iron of a soldering point; and electrical heating means therefor comprising a plurality of telescoping insulating tubes; with an electrically heated conductor on said tubes.

2. The combination in a soldering iron of a soldering point; electrical heating means therefor comprising a plurality of telescoping insulating tubes and an electrically heated conductor on said tubes; with means for preventing relative rotation of the tubes.

3. The combination in a soldering iron of a soldering point having a stem; a plurality of telescoping tubes mounted concentrically with said stem; and an electrically heated conductor mounted on said tubes.

4. The combination in a soldering iron of a soldering point having a stem; a metallic sleeve on said stem; a plurality of refractory tubes mounted concentrically around the stem; and an electrically heated conductor carried by the tubes.

5. The combination in a soldering iron of a handle; a shell attached thereto; a soldering point having a stem extending into said shell; a heating conductor for the point; and a plurality of refractory tubes supporting said conductor within the shell.

6. The combination in a soldering iron of a soldering point; electrical heating means therefor comprising a plurality of refractory tubes supporting said conductors; and means for causing current to flow to one or both of said conductors at will.

7. The combination in a soldering iron of a soldering point; electrical heating means therefor comprising a plurality of conductors; a handle; a head, supply conductors extending into the head; contacts on the head connected to the supply conductors and cooperating contacts on the handle formed to connect the heating elements to the supply conductors in different ways to heat the point at different temperatures.

8. The combination in a soldering iron of a handle; a shell; a soldering point connected to the shell; means for detachably connecting the handle to the shell; electrical heating means in the shell; a terminal block; contacts thereon connected to the heating means; and conductors in the handle detachably engaging said contacts.

9. The combination in a soldering iron of a handle; a shell; a soldering point connected to the shell; means for detachably connecting the handle to the shell; electrical heating means in the shell; a terminal block; contacts thereon connected to the heating elements; conductors in the handles detachably engaging said contacts; a head for the handle; with terminals carried by said head for connection to supply conductors and formed to detachably engage the conductors of the handle.

10. The combination in a soldering iron of a handle; a soldering point; electrical heating means for said soldering point; conductors connected to said heating means and extending through the handle; a head for the handle; with terminals on the head for connection to the supply conductors and including means for engaging the conductors of the handle in a plurality of combinations to vary the heat produced by the heating means.

11. The combination in a soldering iron of a handle; a soldering point; a plurality of electrical heating elements for said point; conductors connected to said elements and projecting from the handle to form contact plugs; a head on the handle; terminals on the head for connection to supply conductors and formed to receive the contact plugs of the handle in a plurality of different combinations to vary the degree of heat produced by the heating element.

12. The combination in a soldering iron of a handle; a soldering point; a plurality of electrical heating elements for said point; conductors connected to said elements and having portions constituting contact plugs of different diameters; a head for the handle; terminals thereon having portions of different diameters formed to cooperate with the contact plugs in a plurality of different combinations; with conductors connected to said terminal members.

FREDERICK F. QUEDNOW.
GEORGE J. VOKEL.